(12) United States Patent  
Blair

(10) Patent No.: US 7,418,381 B2
(45) Date of Patent: Aug. 26, 2008

(54) DEVICE FOR AUTOMATICALLY TRANSLATING AND PRESENTING VOICE MESSAGES AS TEXT MESSAGES

(75) Inventor: Barbara A. Blair, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1158 days.

(21) Appl. No.: 09/949,140

(22) Filed: Sep. 7, 2001

(65) Prior Publication Data

US 2003/0050776 A1    Mar. 13, 2003

(51) Int. Cl.
    G10L 15/26    (2006.01)
(52) U.S. Cl. .................. 704/235; 704/270; 704/270.1; 704/201
(58) Field of Classification Search .............. 704/235, 704/201, 270–275; 455/556.1, 567, 466, 455/412, 412.1, 420, 414.1; 709/227, 230; 379/88.01
    See application file for complete search history.

(56) References Cited

U.S. PATENT DOCUMENTS

| 5,241,586 | A | * | 8/1993 | Wilson et al. | ............. 379/88.11 |
| 5,276,731 | A | * | 1/1994 | Arbel et al. | ............. 379/211.02 |
| 5,477,511 | A | * | 12/1995 | Englehardt | ............ 704/235 |
| 5,566,229 | A | * | 10/1996 | Hou et al. | ............. 379/88.02 |
| 5,832,063 | A | * | 11/1998 | Vysotsky et al. | ......... 379/88.03 |
| 6,122,613 | A | * | 9/2000 | Baker | ................ 704/235 |
| 6,175,820 | B1 | * | 1/2001 | Dietz | ................ 704/235 |
| 6,335,928 | B1 | * | 1/2002 | Herrmann et al. | ........... 370/352 |
| 6,449,496 | B1 | * | 9/2002 | Beith et al. | ................ 455/563 |
| 6,466,654 | B1 | * | 10/2002 | Cooper et al. | ............. 379/88.01 |
| 6,505,160 | B1 | * | 1/2003 | Levy et al. | ............... 704/270 |
| 6,513,003 | B1 | * | 1/2003 | Angell et al. | ............... 704/235 |
| 6,519,479 | B1 | * | 2/2003 | Garudadri et al. | ........... 455/563 |
| 6,651,042 | B1 | * | 11/2003 | Field et al. | ................. 704/270 |
| 6,697,460 | B2 | * | 2/2004 | Knott et al. | .............. 379/88.22 |
| 6,725,194 | B1 | * | 4/2004 | Bartosik et al. | ............ 704/235 |
| 6,728,680 | B1 | * | 4/2004 | Aaron et al. | ................ 704/271 |
| 6,754,619 | B1 | * | 6/2004 | Nakatsuyama | .............. 704/201 |
| 6,775,651 | B1 | * | 8/2004 | Lewis et al. | ................. 704/235 |
| 6,795,536 | B1 | * | 9/2004 | Ronca | ..................... 379/88.25 |
| 6,823,184 | B1 | * | 11/2004 | Nelson | ...................... 455/418 |
| 6,941,273 | B1 | * | 9/2005 | Loghmani et al. | ............. 705/26 |
| 2001/0029175 | A1 | * | 10/2001 | Sellen et al. | ................ 455/412 |
| 2002/0025832 | A1 | * | 2/2002 | Durian et al. | ................ 455/556 |

(Continued)

FOREIGN PATENT DOCUMENTS

JP    59-087542    *    5/1984

OTHER PUBLICATIONS

Dragon/Sony ("Dragon Naturally Speaking Now Offers New Features that 'Automatically Transcribe' into Sony Minidisk Player/Recorder", Breaking News, Jun. 1998).*

(Continued)

*Primary Examiner*—Vijay B Chawan

(57) ABSTRACT

The present invention provides an automatic message capturing system including a recording device in a first location adapted to receive a spoken message and preserve the spoken message as a recorded message, a translation device adapted to automatically translate the recorded message into a text format, and at least one presentation device in a second location adapted to automatically display the text format of the message as a viewable message.

20 Claims, 3 Drawing Sheets

U.S. PATENT DOCUMENTS

| | | | |
|---|---|---|---|
| 2002/0078198 A1* | 6/2002 | Buchbinder et al. | 709/224 |
| 2002/0082839 A1* | 6/2002 | Hinde et al. | 704/270.1 |
| 2002/0087628 A1* | 7/2002 | Rouse et al. | 709/203 |
| 2002/0094067 A1* | 7/2002 | August | 379/88.01 |
| 2002/0103908 A1* | 8/2002 | Rouse et al. | 709/227 |
| 2003/0097262 A1* | 5/2003 | Nelson | 704/235 |
| 2003/0133423 A1* | 7/2003 | LaDue | 370/330 |
| 2004/0049386 A1* | 3/2004 | Niemoeller | 704/235 |

OTHER PUBLICATIONS

Sony/Dragon ("Portable Audio", Sony Style ICD-ST25VTP, Jul. 2001) MPEP 2131.01.*

* cited by examiner

DEVICE FOR AUTOMATICALLY TRANSLATING AND PRESENTING VOICE MESSAGES AS TEXT MESSAGES

FIELD OF THE INVENTION

The invention relates generally to microelectronic devices. More specifically, the invention relates to the area of microelectronic devices for capturing ideas, messages, and memos.

BACKGROUND OF THE INVENTION

Various message-recording systems and devices are known. Past systems have ranged from very low tech, i.e., pen and paper, to very high tech, i.e., electronic organizers, and analog or digital voice recorders. In many instances voice recorders are a preferred method of capturing ideas and messages, as they can record a user's spoken thoughts without requiring the user to stop other activities, e.g. they can be used while the user is driving, shopping, in the shower, etc. However, it is often desirable to view the messages in text format.

Some digital voice recorders are sold with speech recognition software that can be downloaded to a personal computer. A user may then connect the digital voice recorder to the computer with a cable and initiate downloading of a digital voice recording to the computer. Upon a command from the user, the speech recognition software can then translate the digital recording into an electronic text format. Once the electronic text file is created, the user may choose to save the file to the computer, email the file, and/or present the file.

However, these systems do not automatically provide a text format of the spoken message, instead they require the user to connect various pieces of electronic equipment together and initiate the message capturing, message processing, and message display steps. Furthermore, these systems require the user to have access to a computer before the message can be translated into text format and presented on a viewable medium. There exists a need for a message capturing system that allows a user to capture a spoken message and automatically obtain a text format of the message without additional input from the user.

SUMMARY OF THE INVENTION

The present invention provides an automatic message capturing system including a recording device in a first location adapted to receive a spoken message and preserve the spoken message as a recorded message, a translation device adapted to automatically translate the recorded message into a text format, and at least one presentation device in a second location adapted to automatically display the text format of the message as a viewable message.

DETAILED DESCRIPTION OF THE INVENTION

Figure 1:
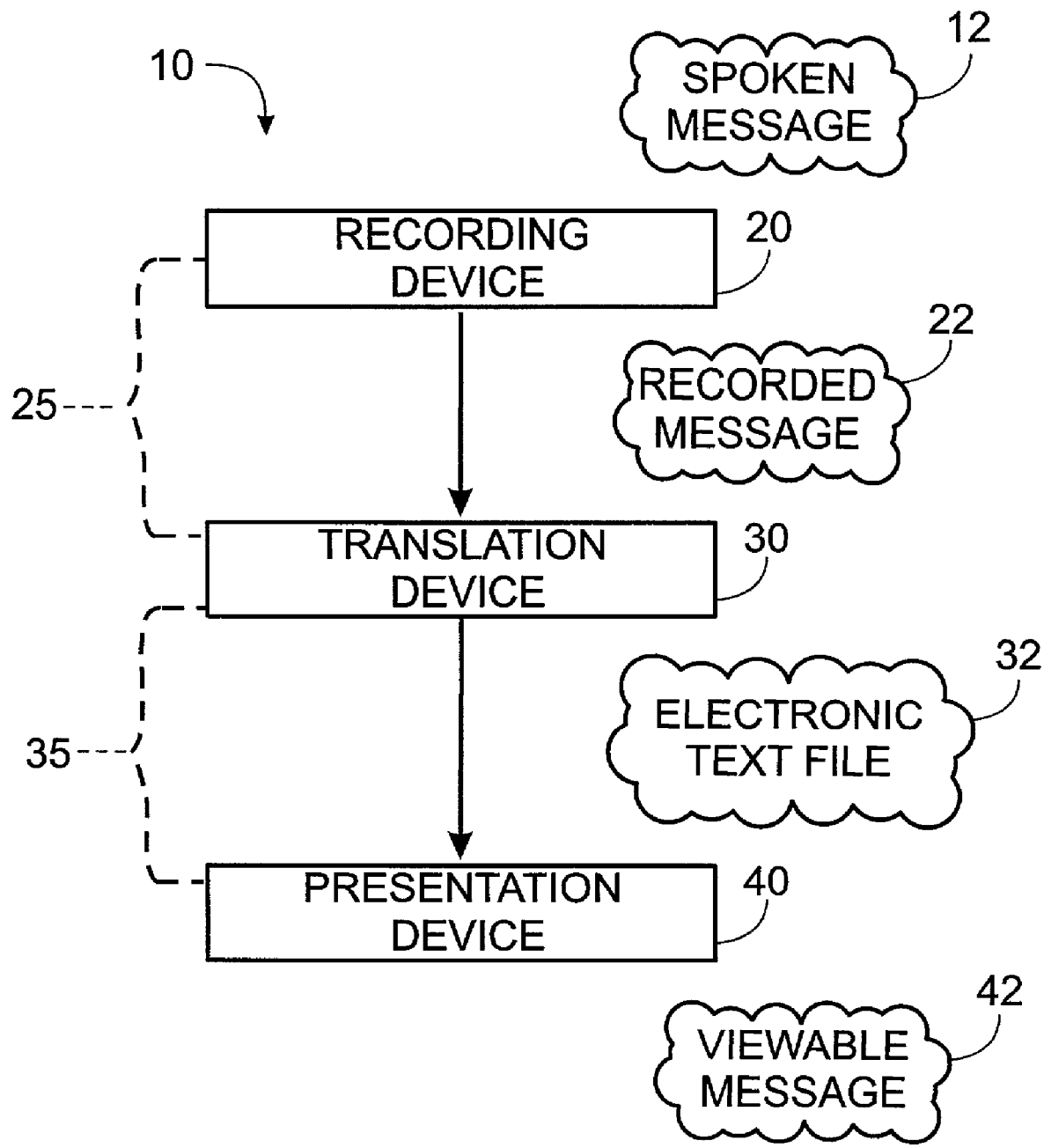
FIG. 1 is an illustration of the message capturing system of the present invention.

FIG. 1 is a schematic illustration of the message capturing system of the present invention. The message capturing system 10 includes three devices: a recording device 20, a translation device 30, and a presentation device 40. The recording device 20 is adapted to receive and preserve a spoken message 12 to create a recorded message 22. The translation device 30 is adapted to receive recorded message 22 and automatically translate the recorded message into an electronic text file 32. The presentation device 40 is adapted to receive the electronic text file and automatically present the file to the user as a viewable message 42. Each of these devices may be a separate device. Alternatively, two or more of these devices may be combined. In one embodiment, the recording and translation devices are combined into a single device 25 (as shown and described later in reference to FIG. 3). In another embodiment, the translation and presentation devices are combined into a single device 35 (as shown and described later in reference to FIGS. 4 and 5).

Still referring to FIG. 1, recording device 20 may be capable of recording in either analog or digital format. Typically, the recording device is a digital recorder having built-in or removable memory. Digital recording devices having built-in memory are commercially available, such as, for example the Olympus DS-320 Digital Voice Recorder. Alternatively, the recording device may be a cell phone capable of recording voice messages or an MP3 voice recorder. Typically, the recording device will include an internal microphone and/or an input for an external microphone. In one embodiment, the microphone may have noise-canceling capability, thereby permitting the recording device to capture only the voice of the user and not background noise, such as running water or traffic noise. Furthermore, recording device 20 may be waterproof, to enable the user to use the recording device in the shower or in wet weather conditions. Typically, device 20 will be a small, portable device. The device may be suitable for carrying in a purse or briefcase.

If the recording device 20 is separate from translation device 30, recording device 20 should have the ability to transmit the recorded message to the translation device. The transmission may be wired; i.e. transmitted through a cable or other physical connection between the devices. Alternatively, the transmission may be wireless, such as by a radio frequency. Wireless transmission may be made, for example, by the use of an 802.11b or Bluetooth-compatible chip or other suitable wireless technology. To provide security and prevent interception of the message by receivers other than translation device 30, the transmission may be sent in encrypted form, in which case recording device 20 should be able to encrypt the message.

Recording device 20 may include a number of user inputs. These user inputs may take the form of physical controls on or off of recording device 20. These inputs may include standard controls found on recording devices such as on/off, record, play, pause, stop, fast-forward, rewind, erase, and volume-control inputs. In addition, the recording device may include user inputs specific to the message capturing features of the recorder. These inputs may, for example, enable the user to send a voice message to the translation device for translation into a text format and/or to control the destination of the text format of the message. Accordingly, once the user has finished recording a message, the user may press a button on the recorder designating the destination of the message, i.e.

printer, email, cell phone, etc. The message is then automatically transmitted to the translation device, translated into text and sent to the selected presentation destination. For example, the user may activate the appropriate buttons or inputs to record the message "Remember to buy milk." Once the message is completed, the user may press the "Email" button or input. The message is then automatically transmitted to the translation device, translated into text and the text message is emailed to the user's email account.

Alternatively, or additionally, the recording device may be voice-activated, such that the device need only detect the user's voice to commence recording. In typical voice-activated devices, recording will terminate once the user's voice is no longer detected. If the recording device has voice-recognition capability, the recording device may include a processor that executes software adapted to recognize a number of voice commands that direct the recording device to perform certain tasks. These tasks may include, for example, recording, erasing, transmitting the message to the translation device, and/or directing the translation device to send the text message to the appropriate present destination.

In this case, once a user has finished recording a message, the user may initiate a voice command to transmit the message to the translation device. This may involve an initial voice command word or phrase that is recognized by the recording device, thereby allowing the recording device to distinguish between speech that is part of a voice command and speech that is part of a message. This initial voice command word or phrase may be preprogrammed in the recording device or may be programmed by the user. Typically the voice command word or phrase is a word or phrase not commonly used in the recorded messages. Therefore, the following might be a typical sequence: "Memo, begin recording: 'Remember to buy milk.' Memo, stop recording, send to my email." In this example, "Memo" is the voice command word. The recording device would thus record, "Remember to buy milk" and automatically send the message to the translation device and then to the user's email account. As with voice recognition software in general, it may be necessary or desirable to indicate punctuation and formatting in the message.

As stated above, translation device 30 is adapted receive the recorded voice message and automatically translate the message into a text-based format. For the purposes of this application, the term "automatically" means without the need for additional input from the user. Thus, once the user indicates that the message is complete, and to which viewable medium the message should be presented, the message is translated and presented without any additional user input or intervention. Typically, translation device 30 includes a processor that executes software that converts the spoken messages into electronic text files. if the recording device 20 records in analog format, the analog recording may be transmitted to the translation device 30, where it is initially converted into a digital recording and then translated into a text-based format. Typically the translating device will include some type of voice recognition software. Voice recognition software is known and commercially available. See, for example, ViaVoice™ speech recognition software available from IBM and Dragon Naturally Speaking™ software available from Corel.

If translation device 30 is separate from recording device 20, translation device 30 should have the ability to receive a wired or wireless transmission from the recording device. If the transmission from recording device 20 is sent in encrypted form, the translation device should be able to decrypt the message.

Similarly, if translation device 30 is separate from presentation device 40, translation device 30 should have the ability to transmit the text file containing the text-based message to the presentation device. Again the transmission may be wired or wireless, and may be encrypted and decrypted, as desired.

As stated above, the translation device may have voice-recognition ability. In this case, the processor in the translation device may execute software adapted to recognize a number of voice commands that direct the translation device to perform certain tasks. These tasks may include various text formatting options and sending the text message to the appropriate present destination.

Presentation device 40 is adapted to automatically display the text message for the user in a user-specified viewable format upon receipt of the message. Presentation device 40 is any device capable of presenting the text message in a viewable format. The viewable format may be in either hard or soft copy format, including, for example, a printout, an email message, a word processing document, etc. As is appropriate, the presentation device may be a printer that prints on paper or other suitable media, a desktop computer, a handheld device having a text display feature, including a phone (cellular or otherwise) etc. Thus, the user may have a variety of options.

Accordingly, system 10 may allow the user to choose between several available presentation destinations. These presentation destinations may be preprogrammed and/or may be programmed by the user. For example, the system may include a pre-wired connection to automatically print to an attached printer. Additionally, the system may include a modem pre-configured to access an Internet connection and email the message to one or more selected email addresses that have been programmed into the system by the user.

Alternatively, system 10 may be simplified by including only one or only a few of these options. For example, the system may only enable a single presentation device such as a printer, computer or handheld device. Alternatively, or additionally, the presentation device itself may be simplified by limiting the capabilities of the device. If the presentation device is a printer, the printer may be a standard or non-standard sized printer. In order to maintain a compact design, it may be desirable for the printer to be of a compact design adapted to print onto small memo-sized sheets of paper. It also may be desirable to limit the printing capabilities of the printer, i.e. the printer may be limited in the type of media on which it may print, limited to black and white printing, etc.

System 10 may include a modem adapted to access the Internet through a phone line, DSL line, ISDN line, cable line, or other suitable wired connection. Alternatively, the modem may be adapted to access the Internet through a wireless connection. Wired and wireless modems are known and commercially available.

System 10 may be configured to connect to the Internet via the user's service provider, or may be configured to connect to a dedicated Internet provider adapted to receive messages from system 10 and other like systems and transmit these messages to the appropriate email accounts.

Figure 2:
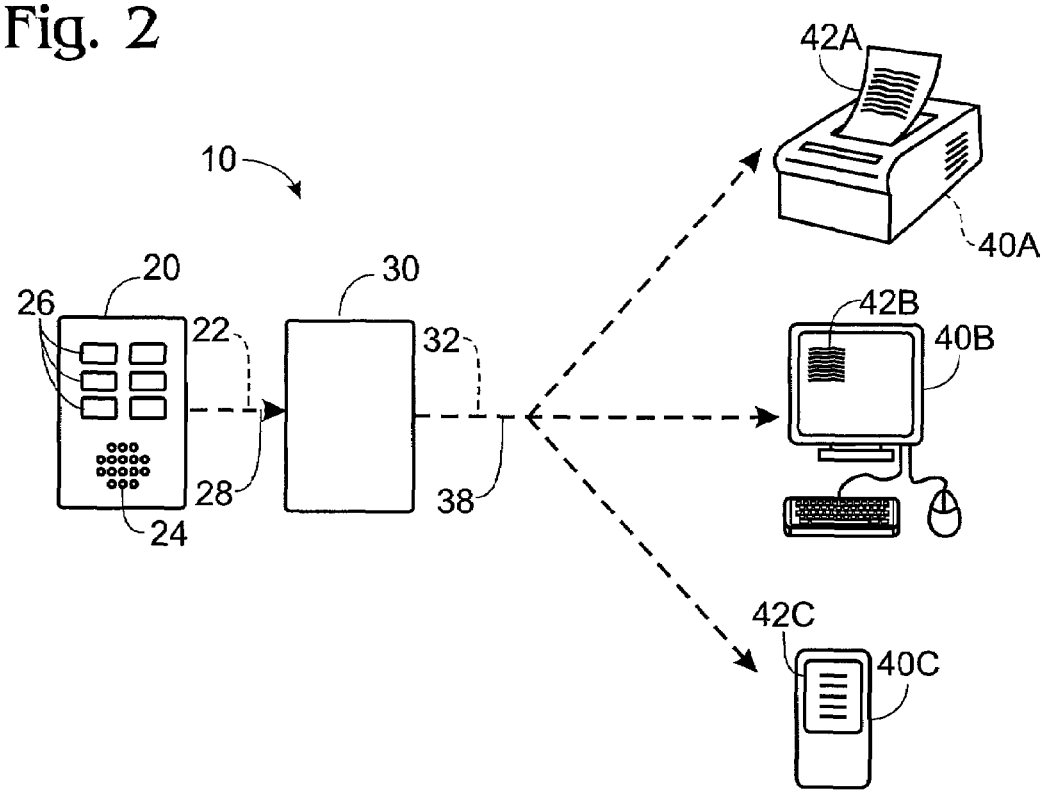
FIG. 2 is a schematic illustration of one embodiment of the message capturing system of FIG. 1.

FIGS. 2-5 are schematic illustrations of various possible configurations for message capturing system 10. In FIG. 2, recording device 20 includes microphone 24 and input buttons 26. Transmission 28 carries recorded message 22 from recording device 20 to translation device 30. Translation device 30 translates the spoken message 22 into text format 32. Transmission 38 carries the text format message 32 to the presentation device(s), which in FIG. 2 take the form of printer 40A, computer 40B, and/or handheld device 40C, which may be a phone, electronic organizer, pager or any other suitable device capable of receiving wireless transmissions and displaying the transmission as a viewable message. Computer 40A, printer 40B, and/or handheld device 40C then displays viewable message(s) 42A, 42B, and/or 42C, respectively.

Figure 3:
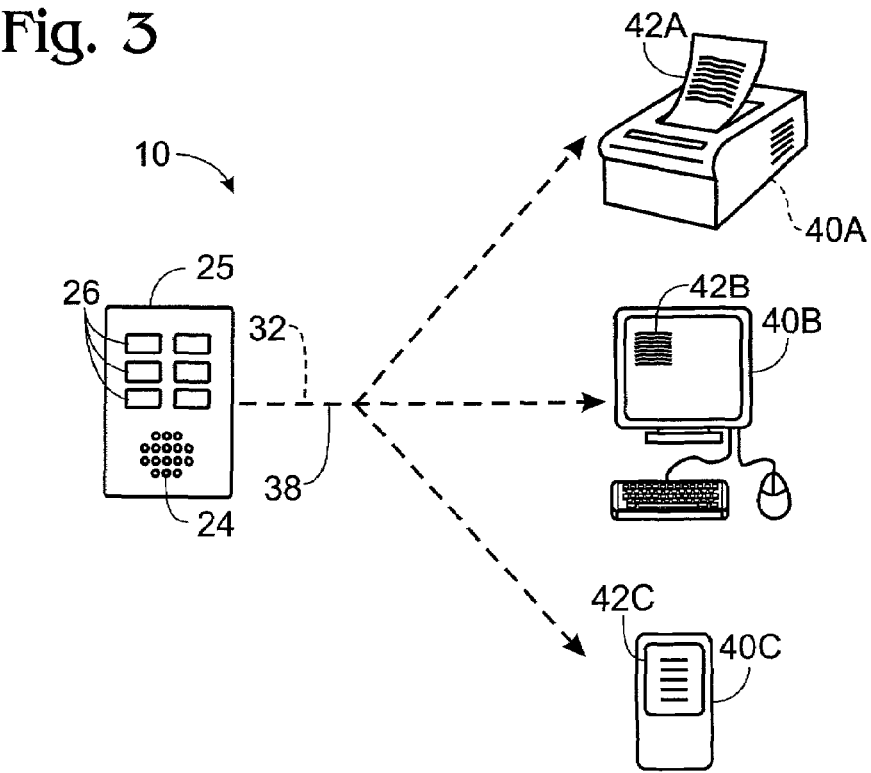
FIG. 3 is a schematic illustration of another embodiment of the message capturing system of FIG. 1 having a combined recording and translation device.

In FIG. 3, device 25 is a combined recording device and translation device. As shown, device 25 includes microphone 24 and user inputs 26. The message is recorded and translated into text by device 25. The text message 32 is then transmitted by transmission line 38 to presentation device(s) 40A, 40B and/or 40C, where the message is displayed as viewable message(s) 42A, 42B and/or 42C.

Figure 4:
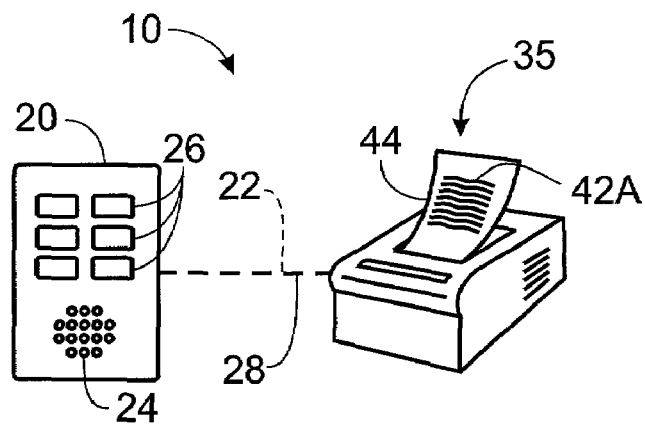
FIG. 4 is a schematic illustration of another embodiment of the message capturing system of FIG. 1 having a combined translation and presentation device.

In FIG. 4, transmission line 28 carries recorded message 22 from recording device 20 to device 35, which is a combined translation device and presentation device. In FIG. 4 device 35 is illustrated as a printer configured to print onto paper or other suitable media 44, but may take the form of any of the presentation devices described above. The message is translated into a text message 32 by device 35 and the viewable message 42A is automatically printed.

Figure 5:
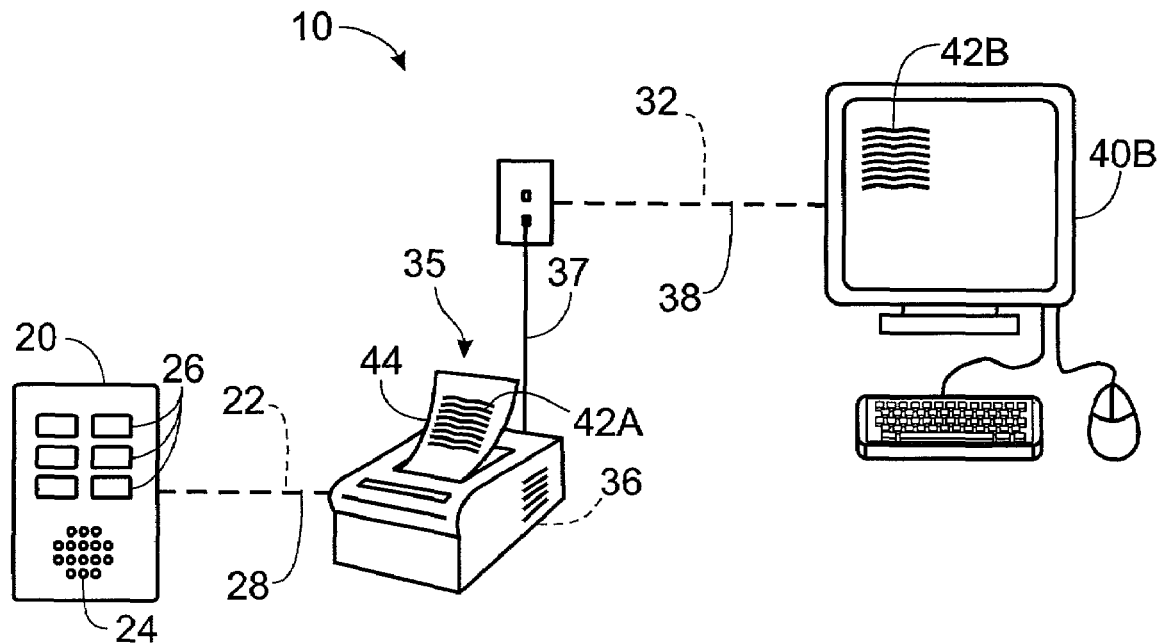
FIG. 5 is a schematic illustration of another embodiment of the message capturing system of FIG. 1 having a combined translation and presentation device adapted to transmit the text-based message to a second presentation device.

In addition, as further shown in FIG. 5, device 35 may include a modem 36, which connects to a phone line or other Internet connection through line 37. Text message 32 is carried by Internet transmission line 38 to a second presentation device, illustrated in FIG. 5 as computer 40B, which displays the text message 32 as a viewable email message 42B. Thus, depending upon the desire of the user, the text message 32 may be printed onto paper or other suitable media 44, sent as an email message, or both.

In any of the embodiments depicted in FIGS. 2-5, the recording device and the presentation device may be located remotely from each other. For example, the user may record the spoken message on the recording device while on the way to work and have the message automatically emailed to the user's office email account; ready to be viewed when the user arrives at work. Furthermore, any or all of the recording device, translation device, and/or presentation device may take the form of portable devices, including small handheld devices as described above.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A message capturing system comprising:
   a portable recording device in a first location adapted to receive a spoken message from a user in the first location and to preserve the spoken message as a recorded message in the first location;
   a translation device adapted to receive the recorded message from the recording device, to automatically translate the recorded message into a text message, and to automatically send only the text message; and
   at least one presentation device in a second location adapted to receive the text message from the translation device and to automatically display the text message to the user as a viewable message at the second location.

2. The system of claim 1 wherein the recorded message is sent from the recording device to the translation device via a wireless transmission.

3. The system of claim 2 wherein the wireless transmission is made by use of a Bluetooth-compatible chip.

4. The system of claim 2, wherein the recorded message is sent from the recording device to the translation device upon receiving a voice command.

5. The system of claim 1 wherein the text message is sent from the translation device to the presentation device via a wireless transmission.

6. The system of claim 5 wherein the wireless transmission is made by use of a Bluetooth-compatible chip.

7. The system of claim 1 wherein the recording device is a digital recorder.

8. The system of claim 1 wherein the presentation device is a printer.

9. The system of claim 1 wherein the presentation device is a computer adapted to display the text message in a viewable form.

10. The system of claim 1 wherein the presentation device is a handheld device adapted to display the text message in a viewable form.

11. The system of claim 1 wherein the recording device has a filter adapted to reduce or remove background noise.

12. The system of claim 1, wherein the portable recording device and the translation device are combined as a single portable device in the first location.

13. The system of claim 1, where the translation device and the presentation device are combined as a single device in the second location.

14. A method for capturing messages comprising:
    digitally recording with a portable recording device in a first location, a spoken message from a user in possession of the recording device, to provide a recorded message;
    automatically sending the recorded message to a translation device;
    automatically translating the recorded message into a text message with a translation device;
    automatically sending only the text message to a presentation device in a second location, remote from the first location; and
    automatically presenting the text message to the user as a viewable message by the presentation device in the second location.

15. The method of claim 14 wherein the recording and translation devices are combined into a single portable device in the first location.

16. The method of claim 14 wherein the translation and presentation devices are combined into a single device in the second location.

17. The method of claim 14 wherein the presentation device is a printer.

18. The method of claim 14 wherein the presentation device is a computer.

19. The method of claim 14 wherein the presentation device is a handheld device.

20. The method of claim 14 wherein automatically sending the recorded message to the translation device is effected by voice command.

* * * * *